Aug. 23, 1966     W. L. SONES ET AL     3,267,994
HOUSEHOLD CONDITIONING SYSTEM

Filed Aug. 31, 1964     3 Sheets-Sheet 1

INVENTORS
William L. Sones
James O. Elliott
George A. Neyhouse
BY
J.C. Evans
Their Attorney Aug. 23, 1966 W. L. SONES ET AL 3,267,994
HOUSEHOLD CONDITIONING SYSTEM
Filed Aug. 31, 1964 3 Sheets-Sheet 2

INVENTORS
William L. Sones
James O. Elliott
BY George A. Neyhouse

J.C. Evans

Their Attorney

Aug. 23, 1966

W. L. SONES ET AL 3,267,994

HOUSEHOLD CONDITIONING SYSTEM

Filed Aug. 31, 1964

INVENTORS
William L. Sones
James O. Elliott
BY George A. Neyhouse

J.C. Evans

Their Attorney

United States Patent Office 3,267,994
Patented August 23, 1966

3,267,994
HOUSEHOLD CONDITIONING SYSTEM
William L. Sones, Dayton, James O. Elliott, Xenia, and George A. Neyhouse, Dayton, Ohio, assignors to General Motors Corporation, Detroit, Mich., a corporation of Delaware
Filed Aug. 31, 1964, Ser. No. 393,202
16 Claims. (Cl. 165—28)

This invention relates to environmental conditioning systems and more particularly to control systems for heating and/or cooling systems for maintaining predetermined desired environmental comfort conditions.

In conditioning residences, office buildings and the like, refrigerant systems and heating systems often have been integrated into a common conditioning system for modulating and distributing air to obtain desired temperatures and humidities within the environment being conditioned.

In such systems it is desirable both from an operating efficiency and a conditioning standpoint to operate the system more or less continuously. While it is desirable to have such a continuous modulation of the air being treated, in the past, for example, refrigerant systems have relied upon a concept of on and off cycling of a refrigerant compressor in response to sensed temperatures to modulate the treated air. Accordingly, during periods of refrigerant system operation, a full on or off condition exists that at times may introduce too much cold or at other times is inadequate to meet the demands of the regions being treated. Likewise, in distributing conditioned air to the regions being treated, typically fan means are provided that are either at a full on or full off condition. Thus, the treated air is usually circulated at a predetermined compromise rate that either fails to satisfactorily distribute needed volumes of conditioned air to meet high demand requirements or is too great when the conditioned region is not subject to extreme changes in temperature or the like.

Because of the above-mentioned operating inflexibility, it has been found that there is either a substantial lag or a like overshoot of conditions in the environment with respect to desirable comfort control points. Moreover, such operation obviously materially reduces operating efficiency.

An object of the present invention, therefore, is to improve the operation of systems for conditioning environments by the provision therein of a static semiconductor computer control means for continuously varying the energization of electric motor means whereby conditioning components of the system are driven to maintain desirable comfort control points in the conditioned region without any substantial lag or overshot of the control points.

A further object of the present invention is to provide an integrated heating and cooling system including a source of heat, a refrigerant system, means including fan means for distributing air conditioned by said heat source and said refrigerant system wherein the compressor and fan are driven by motor means controlled at a desired speed norm by a solid state computer controller having semiconductor switch means with a power supply conductivity related to a feedback signal of the speed of the compressor motor and further having comfort control programmer means for infinitely varying environmental conditions on a seasonal basis in part by infinitely varying the feedback signal from the electric motor means within predetermined limits.

Further objects and advantages of the present invention will be apparent from the following description, reference being had to the accompanying drawings wherein a preferred embodiment of the present invention is clearly shown.

Figure 1:
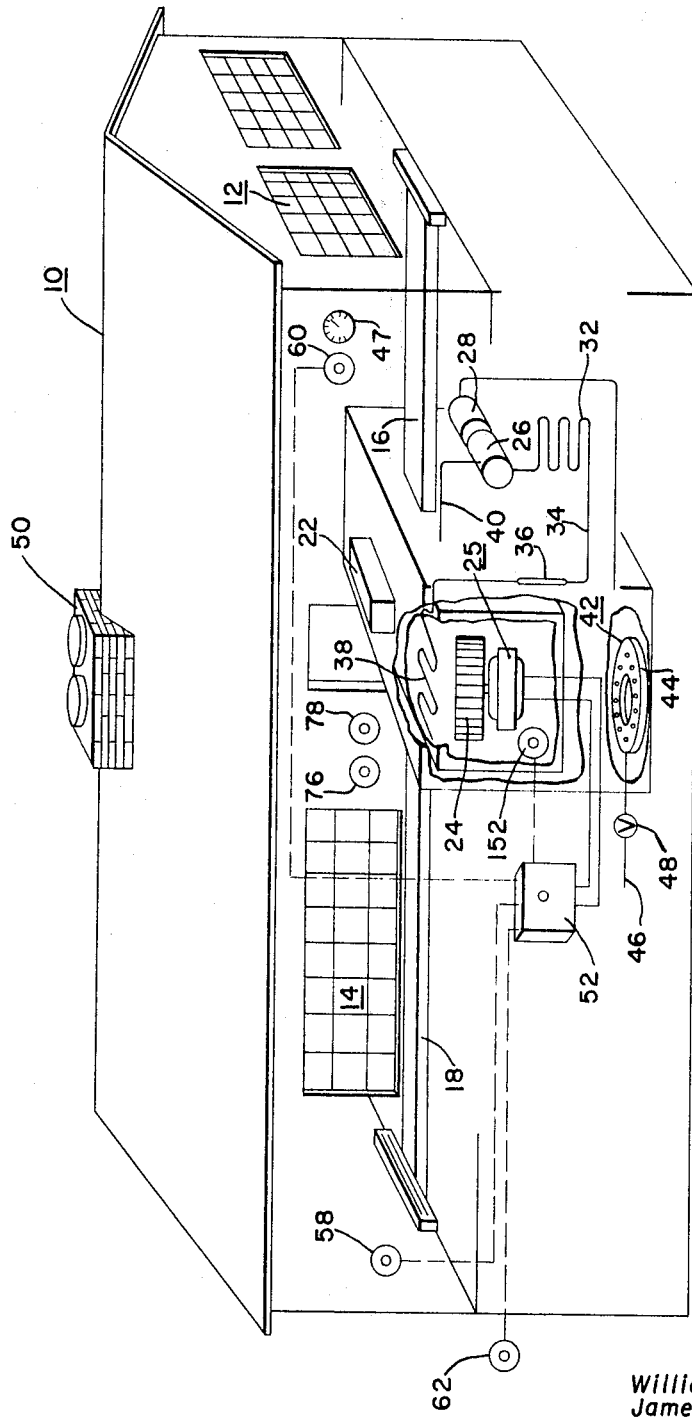
FIGURE 1 is a schematic view of the inventive year around environmental conditioning system shown in association with a residential housing unit.

With reference to the drawings in FIGURE 1, an environmental conditioning system is shown in association with a residential household unit 10 representatively illustrated as including a first conditioned region or room 12 and a second conditioned region or room 14 that are separated from one another by interior walls or the like as typically found in such units.

The rooms 12 and 14 are connected by means of supply ducts 16, 18, respectively, to an air supply plenum 20. The air supply plenum 20 will typically be in communication with a return duct 22 (partially shown) for directing air from the regions 12, 14 back into the plenum. Air circulation is maintained by a suitable fan 24 driven by a blower motor 25 for drawing air from the return duct 22 and forcing it under pressure through the supply ducts 16, 18 into the rooms 12, 14.

A refrigerant system is diagrammatically illustrated as including a compressor unit 26 that is driven by an electric motor 28 to compress refrigerant that is directed through a conduit 30 and thence through a condenser 32 and another conduit 34 through a refrigerator expansion means representatively shown as being a capillary tube 36 thence through an evaporator 38 back to the inlet of the compressor 26 through a conduit 40. The closed serially arranged refrigerating system preferably has the evaporator 38 in direct convective heat transfer relationship with air being conditioned within the plenum 20 for passage exteriorly thereof for providing a desired cooling of air to be discharged into the regions being conditioned. In addition, the environmental control system includes a heat source 42 representatively illustrated as comprising a gas burner unit 44 supplied by an inlet line 46 under the control of a valve 48, for example, a solenoid actuated valve selectively opened and closed in response to temperatures sensed by a room thermostat 47 having circuit contacts 49. The combustion products of the gas heater 44 are passed in direct heat transfer contact with air in the plenum 20 and thence through a suitable waste chimney 50 by conduit (not shown) to effect a desired heat input into the plenum 20.

In accordance with certain of the principles of the present invention, an improved control system is associated with the representatively illustrated heating and cooling systems for regulating it to produce a continuously modulated source of conditioned air into the regions 12 and 14 in a manner to produce a year around comfort control having substantially no temperature lag or overshoot from a preselectable comfort control point.

Figure 2:
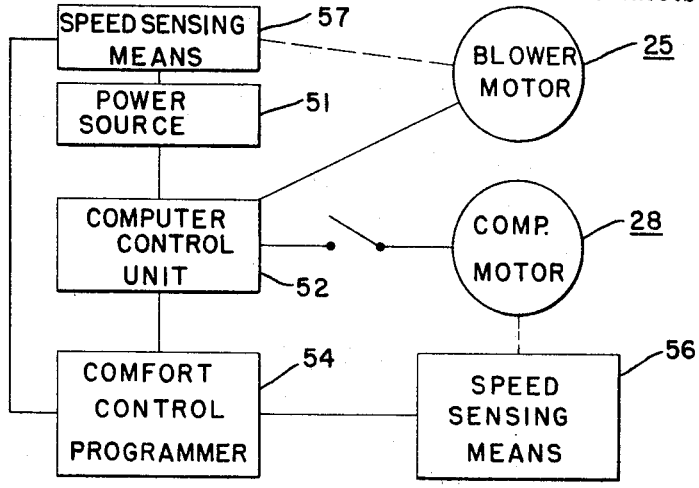
FIGURE 2 is a block diagram of the present invention.

The improved control system is generally designated in FIGURE 2 as including a source of power 51 for driving the refrigerant compressor motor 28 and the fan motor 25 under the control of a static solid state computer and power control package 52 which is associated with a comfort control programmer 54 which conditions a feedback signal from speed sensor means 56 from the compressor motor 28 for regulating the power control package 52. A like speed sensor means 57 is associated with the fan motor 25 to send a signal to programmer 54 for modulating the control action thereof.

In the representative illustration of the improved system, the computer control unit 52 receives information from variable resistance temperature sensing units 58, 60, 62 located in the conditioned regions 12, 14 and the exterior environment around the housing unit 10 as well as the signal from the speed sensing means 56 under the control of the comfort control programmer 54. Other suitable controls such as humidity can also be fed into the computer unit 52, if desired. The signal receiving computer unit 52, as will be described in greater detail, determines the power to be applied to the compressor motor 28 and blower motor 25 in accordance with the input signals from the sources mentioned above.

One feature of the present invention is that the computer of the control system for modulating heating and cooling effects by varying the power to the motors 25, 28 includes static state semiconductor means that can be arranged in very compact control packages easily mounted with respect to the environmental control system. Additionally, such static semiconductor means establishes an improved reliability in the system insofar as its life expectancy is concerned. Another feature of the invention is that motors 25, 28 are of the A.C. induction type. Such motors have been found to be unusually suited for systems of the above discussed type in that they are unusually economical as compared to like horsepower universal and D.C. motors. Furthermore, A.C. induction motors are preferred because of their good torque characteristics over a wide range of operating speeds.

Figure 3:
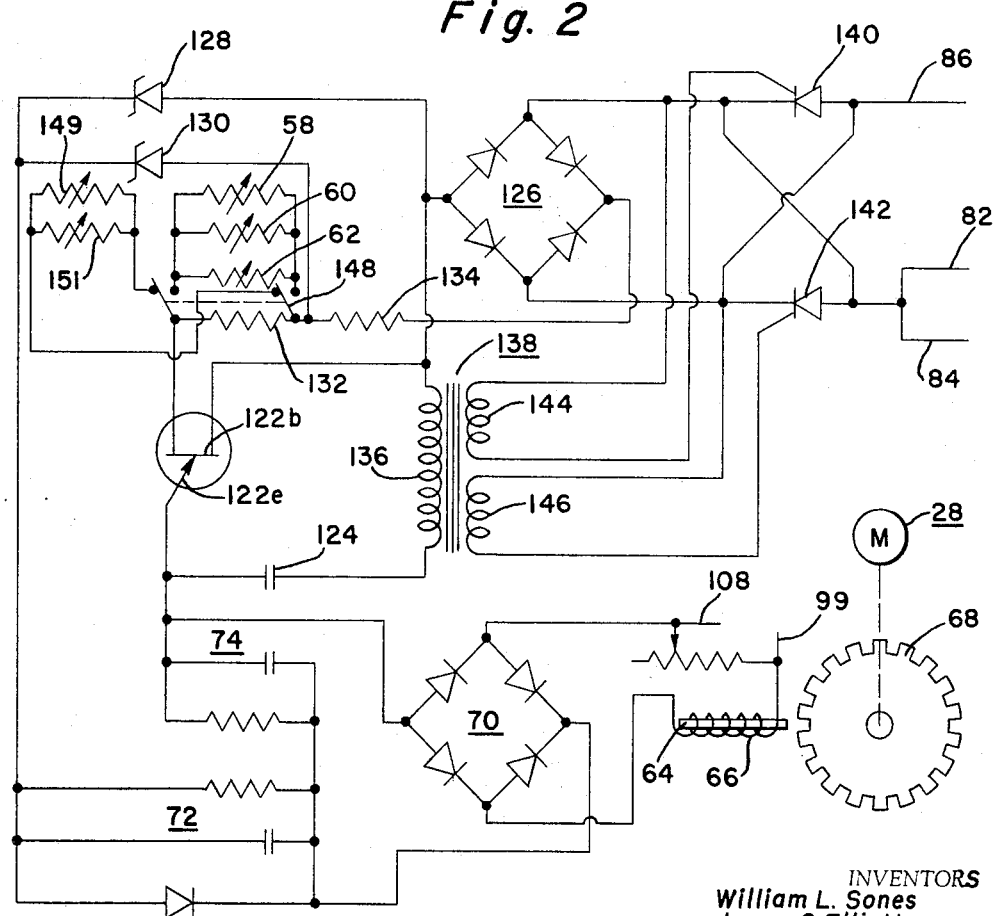
FIGURE 3 is an electrical circuit diagram of a solid state computer for practicing the present invention.

The speed discriminator section or speed sensing means 56, as shown in detail in FIGURE 3, includes a permanent magnet pickup means similar to a type used on dynamometers and includes a number of turns of wire 64 wound on a small magnet 66 located radially in alignment adjacent to a toothed wheel means 68 suitably secured for rotation with the shaft of the compressor motor 28. The above-described speed signal sensing means is located preferably inside a sealed motor compressor shell. The speed signal produced by the magnetic pickup is rectified by a full-wave rectifier bridge 70 and filtered by a filter unit 72 and passed to a filter unit 74 into the computer control unit 52.

In accordance with certain of the principles of the present invention, the comfort control point for a given heating or cooling operation is controlled by means including a summer comfort control indicating member 76 and a winter comfort control member 78 that have suitable indicia thereon such as early summer, mid-summer, late summer in the case of the summer control in early spring, late fall and winter in the case of winter control. These control members 76, 78 enable the heating and cooling effects of the refrigerant system and heat source, respectively, to be selectively infinitely varied within a range limited by the maximum speed of compressor and blower motors 28, 25 and a minimum speed determined by design conditions such as motor heating. Such control of heat and cold input into the mass of air enables the system to operate substantially continuously whereby a desired predetermined control point can be maintained without any substantial lag or overshoot, notwithstanding changes in ambient conditions interiorly of the environment being conditioned and changes in heat loads being introduced into the environment being conditioned.

Figure 4:
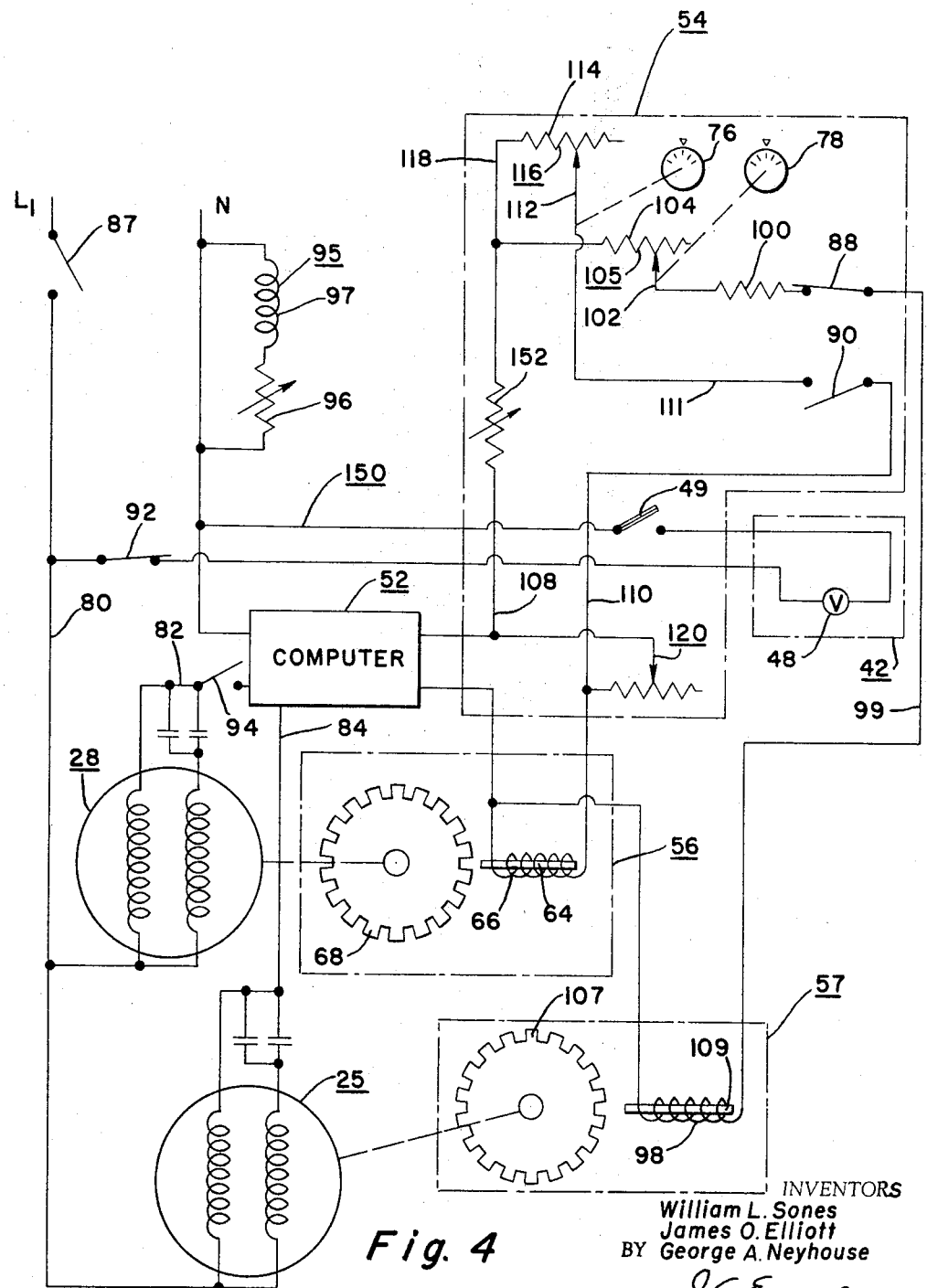
FIGURE 4 is an electrical circuit showing the computer associated with the comfort control programmer of the present invention.

Referring now to FIGURE 4, the control for the enviromental conditioning system is more detailedly set forth with the variable speed compressor motor 28 and blower motor 25 being shown powered from a 115-volt residential power source including a line $L_1$ connected to a conductor 80 that supplies power to the A.C. induction motors 25, 28 which are representatively illustrated as being of a permanent capacitor start type having conductors 82, 84 connecting the motors, respectively, to output terminals of the computer control unit 52 which has another output terminal thereof connected to another conductor 86 that connects to a line N of the power source. Power from lines $L_1$, N through conductors 80, 86 is selectively controlled by a line switch 87.

Referring now more particularly to the comfort control programmer 54, in FIGURE 4 a switching device is illustrated including a plurality of relay actuated switches 88, 90, 92, 94 operatively associated with a crossover relay 95 that is selectively actuatable in response to a predetermined temperature range for selectively connecting the heating system and cooling system in circuit with the computer 52. The relay includes a temperature responsive element 96 representatively illustrated as being a high positive coefficient of resistance element such as a thermistor that reduces current flow across a coil 97 as the temperature increases. The relay 94 is representatively illustrated as being included in a conductor 98 from the conductor 86. The thermistor element 96 preferably is located to sense the enviroment temperature somewhere between the regions 12, 14 at a point reflecting somewhat average conditions therein.

In operation, the relay 95 is calibrated to switch the heating and cooling systems into circuit with the computer 52 at the limits of a predetermined temperature range. For example, if it is desired generally to control the regions being conditioned within a 10° F. range, when the temperature sensed by the resistance element 96 is at either end of this range, for example at 70° F. or 80° F., the relay will switch one or the other of the systems into circuit with the computer 52 in the following manner. Assuming that the heating system is in circuit with the computing circuit 52, the relay 95 is conditioned so that the relay switches 88 and 92 are closed and the relay switches 90 and 94 are opened. If the temperature of the region being conditioned reaches 80° as might occur when the outside temperatures are in the 90° range, the relay coil 97 will be de-energized and the switches 88, 92 will open and the relay switches 90, 94 will close to include the cooling system in circuit with the computer 52. Similarly when the cooling system is running and the temperature of the conditioned region reaches 70° F. as might occur when the outside temperature begins to drop, the relay 95 will condition switches 88, 90, 92 and 94 for heating operation.

More specifically during winter seasonal operation, the comfort control programmer 43, because of the aforementioned action of the relay 95, is conditioned to complete a winter seasonal control circuit therein including one terminal of the magnetic pickup winding 98 in speed sensor means 57 like winding 66 in sensor means 56 through a conductor 99, through the closed relay switch 88 and thence to a resistance element 100, a movable contact carrying arm 102 driven by the manually adjustable winter control member 78 relative to a variable resistance 104 of a potentiometer 105 that has a greater or lesser portion of the resistance thereof thereby placed in series with conductor 106 and conductor 108 electrically connected to a terminal of the input bridge 70.

By virtue of the above-described winter seasonal control circuit, a user of the environmental control system can modify a voltage from winding 48 produced by rotation of a toothed wheel 107 relative to a magnetic pickup 109 of the speed sensor 57 to thereby control the voltage input to the blower motor 25 and hence increase the rate of circulation of heat or reduce it to correspond to a desired comfort control condition as set by the control member 78.

When the relay 95 conditions the comfort control programmer for summer operation, the switch 88 is opened and switch 90 is closed whereby a summer seasonal control circuit is completed including a conductor 110, the closed relay switch 90, a conductor 111, a movable contact carrying arm 112 that is moved with respect to a variable resistance portion 114 of a summer control potentiometer 116 upon adjustment of the summer control member 76. From the variable resistance 114, the circuit is connected by a conductor 118 to the conductor 108 and thence into one of the input terminals of the bridge 70. By virtue of this arrangement, the summer temperature in the environment being conditioned can be adjusted to a predetermined comfort control point by manipulation of the control member 76 which produces a predetermined change of the speed input signal from the coil 64, as in the case of the winter seasonal control circuit. A calibrating potentiometer 120 is connected across the conductors 99, and 108 for adjusting the input signal to the computer control unit 52 when the control system is originally installed.

In the illustrated embodiment of the invention, signal input from the magnetic speed pickup means 56 and 57 as modified by the comfort control programmer unit 54, is rectified and filtered by the bridge 70 and capacitive filter unit 74, and then directed through a solid state semiconductor network including a unijunction transistor 122, connected emitter 122e to base 122b across a capacitor 124. The signal from the capacitive filter 74, in response to variations in the input signal from the magnetic speed pickup means 56, 57 as modified by the comfort control programmer 54, regulates firing of the transistor 122 in combination with a control potential produced by a bridge circuit 126 that rectifies the A.C. power source across lines 82, 84, 86 to D.C. power with the voltage across the output of bridge 126 being regulated by Zener diodes 128, 130 in conjunction with resistances 132, 134. Depending upon the imbalance between the control potential produced by the bridge 126 that is fed through a filter 72 to the filter 74 and the variable input signal from the bridge 70 and capacitive filter 74, the unijunction transistor 122 fires to produce a motor control signal in a primary coil 136 of a pulse transformer 138. Firing of the transistor 122 allows the capacitor 124 to discharge through a low impedance path from the transistor emitter 122e, base 122b and the primary coil 136 to produce a voltage spike therein. The voltage spike acts as a control signal that serves as the intelligence for operating a solid state power supply switch for supplying power to the motors 25, 28 with the power supply switch being representatively illustrated as including a pair of oppositely facing silicon controlled rectifiers 140, 142 which are actuated by the signal induced in the secondary coils 144, 146 of the pulse transformer 138 to be energized for a predetermined period of the full wave form of the A.C. power supply across lines $L_1$, N to produce a variable energization of the blower motor 25 and compressor motor 28 to hence control the operative speed thereof.

During both the operation of the heating and cooling systems, it is desirable and somtimes preferable, depending upon the type of environment being conditioned by the system, to feed additional input intelligence to the computer unit 52 to modify the output signal thereof for varying the speed or blower and compressor motors to compensate for variances in conditions sensed by the means supplying the additional intelligence. For example, in the illustrated embodiment of the invention, the temperature sensors 58, 60, 62 are included in parallel with the resistance 132 in the circuit for controlling the firing of the transistor 122 and the consequent triggering of the silicon controlled power switches 142, 142 to slow down and speed up the compressor motor and the blower motor to compensate for anticipated changes in the ambient conditions outside of the house 10 as well as to take into account changes in the heating load within the regions 12, 14 being conditioned by the system. For example, in the illustrated arrangement, the sensors 58, 60, 62 are high positive coefficient of resistance elements such as thermistors that will act to increase the motor speed upon increases in temperature to produce an additional cooling effect and greater circulation of the mass of air being cooled to compensate for the increased temperatures. When the relay 95 switches the system to winter operation, these elements are taken out of the circuit by a relay switch 148 which acts to include in the circuit winter sensors 149, 150 located in the regions 12, 14 in the control circuit. These sensors are negative coefficient of resistance elements. While the summer and winter sensing units are illustrated as being positive and negative coefficient of resistance elements, respectively, it will be appreciated that opposite temperature coefficient of resistance elements could likewise be included in the system by making appropriate changes in the representatively illustrated solid state computer unit.

If desired, humidity sensing units can also be incorporated in the system to modify the action of the solid state computer unit whereby, upon an increase in humidity, the compressor motor speed will be increased to further cool the evaporator 38 of the refrigerant system which may serve as a moisture extracting device by freezing the moisture in the circulated mass of air as it passes thereover. In this case, as is well known in the art, suitable heating means can be included adjacent the evaporator to periodically melt the ice on the evaporator for passage into a suitable drain.

By virtue of the above-described control system, a user merely has to set a desired summer and winter comfort control point on the seasonal control members 76, 78. During summer, the summer control circuit of the programmer 54 will regulate the input signal of the magnetic pickup on the compressor motor to maintain the speed of the motor at a basic control point that is modified by the temperature sensors in the environment being treated whereby the compressor motor speed will vary about the motor speed norm of the set comfort control point to produce a desired cooling of the mass of air being circulated across the evaporator 38 to meet the cooling demand. The provision of the separate sensing elements 58, 60, 62 will continually vary the speed of the compressor motor on either side of the set speed norm to anticipate increases in outside temperature and changes in the cooling load required in the regions 12, 14 to effectively maintain a desired environment in the regions. The changes in speed of the motor compressor are followed by like changes in speed of the blower motor so that the additional cooling effect is manifested in the regions being treated by a corresponding increase in the rate of circulation effected by the fan 24.

When the system automatically crosses over to winter operation as, for example, when the temperature sensed by the crossover relay switch reaches 70° F., the winter seasonal control circuit is closed and the heat source representatively shown as a gas burner 44 is turned on by closing relay switch 92 to complete a gas valve energization circuit 150 to solenoid 48 which includes the thermostat contact 49. Heat regulation is obtained by suitable means as, for example, a temperature sensor in the bonnet of the furnace that can be included as a high positive coefficient of resistance element such as a thermistor 152 that is included in the conductor 108 on the winter seasonal control circuit so that the speed of the blower will increase upon increases in the bonnet temperature whereby the effective B.t.u. output of the furnace is distributed quickly to the regions being treated to prevent any substantial change from the control point established by the thermostat 47. As was pointed out above, during the winter operation the compressor motor 28 is disconnected from the power supply and the blower motor speed 25 is thereby modified by changes in the resistance of the bonnet temperature sensing element 152 as fed into the computer from the programmer 54. Also during this operation, the blower speed sensor means 57 produces a speed modified by programmer 54 to effect sensor speed control during late fall, early spring and the like.

While the representative environmental conditioning system is illustrated as including a separate source of heat, it will be appreciated that the refrigerant system can be operated as a heat pump merely by the provision of suitable reversing valves therein which can be conditioned by an automatic crossover switch or suitable manual selector switch means to provide the desired heat input into the system.

It will also be recognized that the comfort programmer and solid state computer unit are adaptable for use with a separate refrigerant system for conditioning a predetermined environment in which case the heater system and circuitry therefor would be eliminated or vice versa. One advantage of the integrated heating and cooling systems, however, is that a single solid state semiconductor computer unit serves to control the operation of both the heating and cooling units in a reliable and economical fashion.

The basic concept of a domestic appliance having an A.C. induction motor controlled by a static solid state or semiconductor computer control unit is set forth in our copending United States application, Serial No. 159,014, filed December 13, 1961. The present invention incorporates the basic advantages of appliance control by such static control devices, namely greater control reliability and more exact control capability together with the further improvement comprising additional comfort programmer means for correlating the home heating and cooling operations to varying heating and cooling loads.

While the embodiment of the present invention as herein disclosed constitutes a preferred form, it is to be understood that other forms might be adopted.

What is claimed is as follows:

1. In a household conditioning system the combination of, a refrigerant system including a compressor, a condenser, an evaporator, and means for connecting said compressor, condenser and evaporator in refrigerant flow relationship, a heat source, means including a plenum chamber for receiving air returned from the rooms of a household and for supplying air thereto, said plenum chamber being in heat transfer relationship with said evaporator and said heat source, fan means for directing conditioned air exteriorly of said plenum and for returning air thereto, means for actuating said compressor and said fan means including prime mover means, semiconductor switch means in power supply relationship with said prime mover means, means for deriving a control voltage responsive to the speed of said prime mover means, means processing said control voltage for controlling conductivity of said semiconductor switch means to maintain said prime mover at a predetermined speed norm, and comfort condition programmer means for infinitely varying said control voltage within predetermined limits to operate said prime mover means at variable speeds for producing variable heating and cooling effects.

2. In a household conditioning system the combination of, a refrigerant system including a compressor, an evaporator and a condenser, means for connecting said compressor, condenser and evaporator in refrigerant flow relationship, a source of heat, means including an air supply and return plenum for directing air to and returning air from rooms in the household, said plenum being located in heat transfer relationship with said evaporator and said heat source, fan means for forcing conditioned air exteriorly of said plenum and for returning air thereto, A.C. induction motor means for driving said compressor and said fan means, a control system for variably modulating the heating and cooling effects of said heat source and said compressor including a control circuit having semiconductor switch means therein for selectively conducting current from a power source to said A.C. induction motor means, means for deriving a control voltage responsive to the operation of said compressor and said fan means, means for processing said control voltage to regulate the conductivity of said semiconductor switch means to maintain said A.C. induction motor means at a predetermined speed norm, and comfort conditioner programmer means for infinitely varying said control voltage within predetermined limits for varying the speed norm of operation of said motor means in accordance with predetermined desired heating and cooling conditions.

3. In a household conditioning system the combination of, a refigerant system including a compressor, an evaporator and a condenser, means for connecting said compressor, condenser and evaporator in serial flow relationship, a source of heat, means including an air supply and return plenum for directing air to and returning air from rooms in the household, said plenum being located in heat transfer relationship with said evaporator and said heat source, fan means for forcing conditioned air exteriorly of said plenum and for returning air thereto, A.C. induction motor means for driving said compressor and said fan means, a control system for variably modulating the heating and cooling effects of said heat source and said compressor including a control circuit having semiconductor switch means therein for selectively conducting current from a power source to said A.C. induction motor means, means for deriving a control voltage responsive to the operation of said compressor and said fan means, means for processing said control voltage to regulate the conductivity of said semiconductor switch means to maintain said A.C. induction motor means at a predetermined speed norm, and comfort conditioner programmer means for infinitely varying said control voltage within predetermined limits for varying the speed norm of operation of said motor means in accordance with predetermined desired heating and cooling conditions, said means for processing said control voltage including means for sensing atmospheric conditions interiorly and exteriorly of the rooms being conditioned for further modulating the controlling action of said semiconductor switch means.

4. In combination, means including an A.C. induction motor means for cooling a mass of air, means for heating the mass of air, means including a second electric motor for circulating the mass of air for conditioning predetermined environments, means for selectively conditioning said A.C. induction motor means for energization from a power source, means for sensing at least two conditions in the environment and adapted to produce two signals in proportion respectively to each of said sensed conditions, and a computer control means including semiconductor switch means in power supply relationship to said A.C. induction motor means for selectively varying the power supply to said A.C. induction motor means, said computer control means including means for simultaneously processing said signals together to control the voltage characteristic of power supplied through said semiconductor switch means to said A.C. induction motor means whereby the supply of heat and the cooling of the mass of air is regulated within predetermined limits to maintain a substantially uniform comfort level in the environment.

5. In an environmental conditioning system the combination of, means including first motor means for cooling a mass of air, means for heating the mass of air, means including second motor means for circulating the mass of air for conditioning a predetermined environment, means for selectively connecting said first and second motor means in power supply relationship with a source of power, computer control means operatively connected to said circuit means, said computer control means including semiconductor switch means for supplying power to at least one of said first and second motor means, means for deriving a control voltage responsive to the speed of at least one of said motor means, said computer control means including means for processing said control voltage for controlling conductivity of said semiconductor switch means to maintain at least one of said motor means at a predetermined speed norm, and comfort control programmer means for infinitely varying said control voltage within predetermined limits to operate at least one of said first and second motor means at variable speeds for producing a modulated heating and cooling of the mass of air to maintain predetermined environmental conditions preset by said programmer means.

6. In an environmental conditioning system the combination of, means including first electric motor means for cooling a mass of air, means for heating the mass of air, means including second electric motor means for circulating the mass of air through an environment to be conditioned, said heat source including means for distributing combustible fuel thereto, first circuit means for operating said fuel supply means to turn said heat source on and off, second circuit means for operating said first electric motor means of said cooling system, switch means for selectively connecting said first and second circuit means to a source of power, computer control means operatively associated with said first and second motor means including semiconductor switch means for regulating the power supply thereto, means for deriving a control voltage responsive to the speed of at least one of said electric motor means, said computer control means including means for processing said control voltage for controlling conductivity of said semiconductor switch means to maintain said motor means at a predetermined speed norm, comfort control programmer means for varying said control voltage within predetermined limits to operate said motor means at variable speed norms for maintaining a range of comfort conditions in said environment, means for sensing environmental conditions including means for producing plural signals, said computer contrlo means responding to said plural signals for varying the conductivity of said semiconductor switch means to modulate the power supply to said electric motor means and the heating and cooling effects to maintain said environment at comfort control conditions established by said comfort control programmer.

7. In an environmental conditioning system the combination of, means including first motor means for cooling a mass of air, means for heating the mass of air, means including a second motor means for circulating the mass of air in heat transfer contact with said cooling means and said heating means and distributing the mass of air to an environment to be conditioned, circuit means including means for selectively operating said heating and cooling means, said circuit means including a computer control means having a semiconductor switch means in power supply relationship with said first and second motor means, means for deriving a control voltage in response to predetermined operating conditions of said first and second motor means, said computer control means including means for processing said control voltage to control the conductivity of said semiconductor switch means for maintaining said electric motor means at a predetermined speed norm, and comfort control pre-programmer means for varying the conditioning effect of said heating and cooling means by infinitely varying said control voltage within predetermined limits.

8. In the combination of claim 7, said comfort control programmer including first and second manually actuatable control members, and means operatively associated with said first and second manually actuatable control members for separately modulating said control voltage for maintaining a desired separate heating and cooling effect of the air being circulated to the environment.

9. In the combination of claim 7, said comfort control programmer means including first seasonal control means connected in circuit with said control voltage processing means for modulating said control voltage in a predetermined manner to produce a desired cooling effect, second seasonal control means including means in circuit with said control voltage processing means for modulating said control voltage in a predetermined manner for producing a desired heating effect, and means for independently placing said first and second environmental control means in circuit with said control voltage processing means so that the modulating action thereof will correspond to separate heating and cooling cycles of operation.

10. In the combination of claim 7, said comfort control programmer means including first seasonal control means for programming a first selectable modulation of said control voltage for producing a predetermined cooling by the mass of circulated air, and second seasonal control means for separately programming a second selectable modulation of said control voltage for maintaining a predetermined heating of the mass of circulated air.

11. In the combination of claim 10, each of said seasonal control means including a manually actuatable control member and variable resistance means responsive to positioning of said control member for effecting modulation of said control voltage.

12. In an environmental conditioning system the combination of, means including first motor means for cooling a mass of air, means for heating the mass of air, means including second motor means for circulating the mass of air in heat transfer contact with said cooling means and said heating means and distributing the mass of air to an environment to be conditioned, circuit means including means for selectively operating said heating and cooling means, said circuit means including a computer control means having a semiconductor switch means in power supply relationship with said first and second motor means, means for deriving a control voltage in response to predetermined conditions of operation of said first and second motor means, said computer control means including means for processing said control voltage to control the conductivity of said semiconductor switch means for maintaining said electric motor means at a predetermined speed norm, means for sensing plural environmental conditions including means for producing plural signals, said computer control means responding to said plural signals for varying the conductivity of said switch means to modulate the heating and cooling effects in accordance with the sensed environmental conditions, and comfort control programmer means for varying the conditioning effect of said heating and cooling means by infinitely varying said control voltage within predetermined limits.

13. In the combination of claim 12, said comfort control programmer means including first seasonal control means connected in circuit with said control voltage processing means for modulating said control voltage in a predetermined manner to produce a desired cooling effect, and second seasonal control means including means in circuit with said control voltage processing means for modulating said control voltage in a predetermined manner for producing a desired heating effect, and means for independently placing said first and second environmental control means in circuit with said control voltage processing means so that the modulating action thereof will correspond to separate heating and cooling cycles of operation.

14. In an environmental conditioning system the combination of, means for cooling a mass of air, means for heating the mass of air, means including electric motor means for circulating the mass of air in heat transfer contact with said cooling means and said heating means and distributing the mass of air to an environment to be conditioned, circuit means for selectively operating said heating and cooling means, said circuit means including computer control means having semiconductor switch means in power supply relationship with said motor means, means for deriving a control voltage in response to predetermined operating conditions of said motor means, said computer control means including means for processing said control voltage to control the conductivity of said semiconductor switch means for maintaining said electric motor means at a predetermined speed norm, and comfort control means for varying the conditioning effect of said heating and cooling means by infinitely varying the effect of said control voltage on said semiconductor switch means within predetermined limits.

15. In the combination of claim 14, said comfort control means including means for directly varying said control voltage prior to processing by said computer control means.

16. In the combination of claim 14, said comfort control means including means for sensing a condition in the environment being conditioned and producing a signal in said computer control means for modulating the effect of said control voltage on said semiconductor switch means.

References Cited by the Examiner

UNITED STATES PATENTS

| | | | |
|---|---|---|---|
| 2,429,408 | 10/1947 | Earley et al. | 165—35 |
| 2,608,066 | 8/1952 | Kirkpatrick | 62—229 |
| 2,744,388 | 5/1956 | Kleist | 62—229 |
| 2,918,807 | 12/1959 | Leonard | 62—476 |
| 3,131,757 | 5/1964 | Bergstrom et al. | 165—35 |
| 3,166,120 | 1/1965 | Butterfield et al. | 165—26 |
| 3,170,508 | 2/1965 | Avery | 165—26 |
| 3,171,595 | 3/1965 | Krenke | 236—9 |
| 3,181,791 | 5/1965 | Axelrod | 236—44 |
| 3,182,222 | 5/1965 | Lacy et al. | 317—148.5 |
| 3,203,473 | 8/1965 | Goode et al. | 165—35 |

ROBERT A. O'LEARY, *Primary Examiner.*

M. A. ANTONAKAS, *Assistant Examiner.*